(12) United States Patent
Baki et al.

(10) Patent No.: US 11,509,867 B2
(45) Date of Patent: Nov. 22, 2022

(54) METHOD AND DEVICE FOR DETERMINING A VISUAL IMPAIRMENT OF A CAMERA

(71) Applicant: Robert Bosch GmbH, Stuttgart (DE)

(72) Inventors: Mihály Dezső Baki, Zámoly (HU); Karoly Varga-Umbrich, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/010,434

(22) Filed: Sep. 2, 2020

(65) Prior Publication Data

US 2021/0168332 A1 Jun. 3, 2021

(30) Foreign Application Priority Data

Nov. 28, 2019 (DE) .............................. 1020198450.2

(51) Int. Cl.
*H04N 7/18* (2006.01)
*G06T 7/00* (2017.01)
*H04N 5/225* (2006.01)

(52) U.S. Cl.
CPC ............. *H04N 7/18* (2013.01); *G06T 7/0002* (2013.01); *H04N 5/2256* (2013.01); *G06T 2207/30252* (2013.01)

(58) Field of Classification Search
CPC .............. G06T 7/407; G06T 7/0002; G06T 2207/30252; H04N 5/2256; H04N 7/18
See application file for complete search history.

(56) References Cited

U.S. PATENT DOCUMENTS

| 6,100,499 A * | 8/2000 | Davila, Sr. ........... B60Q 1/2684 |
| | | 15/250.04 |
| 2005/0206511 A1* | 9/2005 | Heenan .................. G06T 7/254 |
| | | 340/438 |
| 2014/0241589 A1* | 8/2014 | Weber ...................... G06T 7/49 |
| | | 382/108 |
| 2018/0079284 A1* | 3/2018 | Choi ...................... B60K 35/00 |
| 2020/0062180 A1* | 2/2020 | Stein ....................... B60S 1/023 |
| 2020/0232807 A1* | 7/2020 | Müller ................. G06V 20/582 |

FOREIGN PATENT DOCUMENTS

DE 102012209514 A1 1/2013

* cited by examiner

*Primary Examiner* — John W Miller
*Assistant Examiner* — Omer Khalid
(74) *Attorney, Agent, or Firm* — Norton Rose Fulbright US LLP; Gerard Messina

(57) ABSTRACT

A method for determining a structural image of a window of a motor vehicle with the aid of a camera, the window separating the camera from surroundings of the motor vehicle. The method includes a highlighting of image structures present in the structural image with the aid of an illumination of the window, the image structures being suitable for ascertaining a visual impairment of a view of the camera through the window. The illumination is configured in such a way that it is not detected by a driver. A device for implementing the method is also provided.

17 Claims, 4 Drawing Sheets

METHOD AND DEVICE FOR DETERMINING A VISUAL IMPAIRMENT OF A CAMERA

CROSS REFERENCE

The present application claims the benefit under 35 U.S.C. § 119 of German Patent Application No. DE 102019218450.2 filed on Nov. 28, 2019, which is expressly incorporated herein by reference in its entirety.

BRIEF SUMMARY

The present invention relates to a method for determining a structural image of a window of a motor vehicle with the aid of a camera, the window separating the camera from surroundings of the motor vehicle, the method is characterized in that a highlighting of the image structures present in the structural image takes place with the aid of an illumination of the window, the image structures being suitable for ascertaining a visual impairment of a view of the camera through the window, and the illumination being configured in such a way that it is not detected by a driver. According to the present invention, a device for implementing the method is also provided.

BACKGROUND INFORMATION

Modern motor vehicles frequently have a camera for driver assistance functions. Exemplary driver assistance functions, which take place using a camera are: lane-keeping assistant, traffic sign recognition, automatic emergency braking, high-beam assistant, etc. The cameras are designed as stereo cameras or mono-cameras, which accordingly include two or only one imager module and are integrated into a housing. These cameras are positioned, for example, in the vehicle compartment, in the upper area of the windshield, usually centrally and directly behind the windshield.

A degradation of the windshield in this case may result in a loss of efficiency, in particular, in the validation of the image analyses. A degradation may result, for example, due to damage to the windshield, (scratches, stone damage, etc.) or to any change in the spectral transparency of the windshield. A degradation in this case results in local distortions and/or in partially blocked light paths and/or in false color renderings. This results in a false representation of the surroundings of the vehicle in the image data. This may result in erroneous analysis results. A timely identification of a situation as described above is important for the efficiency of the driver assistance system, in particular, the validity of the analysis results and, thus, for the safety of the driver in vehicular traffic. This becomes evident, in particular, in the case of autonomous driving maneuvers in which the camera provides important data for controlling the vehicle.

German Patent Application No. DE 10 2012 209 514 A1 describes a method for detecting a visibility impairment of a vehicle occupant, in particular, due to raindrops. The method includes the step of removing a background brightness from an image of the window, in order to determine a suitable structural image of the window for evaluation.

SUMMARY

In accordance with an example embodiment of the present invention, a method according to the present invention advantageously enables the determination of a visual impairment of a camera when viewing through a window. With this example method, it is advantageously possible to ensure a positive result quality in the image evaluation of the camera. This is made possible according to the present invention by the features described herein. Additional embodiments of the present invention are described herein.

The method according to the present invention for determining a structural image of a window of a motor vehicle with the aid of a camera, the window separating the camera from surroundings of the motor vehicle, is characterized in that a highlighting of image structures present in the structural images takes place with the aid of an illumination of the window, the image structures being suitable to ascertain a visual impairment of a view of the camera through the window, and the illumination being configured in such a way that the illumination in the activated state is not detected by a driver.

This is understood to mean, for example, that the illumination is controlled in such a way that it is not detected by the driver. The control and the position and design of the illumination are accordingly also coordinated with each other in such a way that the illumination is not detected by the driver. In this way, it is possible to avoid a blinding of the driver and as a result to optimize the safety as well as the comfort. While a "control" of the illumination is described within the scope of the present invention, a "regulation" of the illumination is, of course, also encompassed by the present invention. In addition, the driver, in particular, is mentioned, the embodiment in this case may also refer to the driver of the vehicle as well as to any vehicle occupant.

Structures of the window are enhanced and highlighted by the illumination. Such structures may be damage to the window. This may be mechanical damage, cracks or stone damage, for example. Age-related distortions or other degradations may also be rendered visible. The structural image thus enhanced is recorded with the aid of a camera and subjected to an image analysis. In the analysis, it may be determined whether and to what extent a visual impairment is present. The method is suitable for ascertaining specific factors related to the window, which have an influence on the quality of data and thus also on the validity of the results of an analysis of the video data. This means, it may thus be checked whether correct results are achievable with the camera. If significant visual impairments are established, appropriate countermeasures may be carried out.

In one possible embodiment of the present invention, it is provided that a locally restricted illumination of the window takes place. In one advantageous specific embodiment of the present invention, the illumination is designed in such a way that only—or at least essentially—one area of the window is illuminated, which is not visible by a driver of the motor vehicle. The area of the windshield corresponding to the field of view of the driver is advantageously not illuminated. The full driver viewing area of the windshield, in particular, is not illuminated. The driver viewing area is defined as the area of the windshield which may be visible and seen through by the driver, if necessary, also taking a potential head movement into account. In one possible embodiment of the present invention, the illumination does not take place in a driver viewing area.

In one possible embodiment of the present invention, the illumination takes place in a see-through area of the camera. In this case, only—or at least essentially—the camera viewing area of the window is illuminated. A viewing area of the camera is defined as a subarea of the window, which is intended for a viewing by the camera through the window. This area is the area of the window situated directly in front of the camera. The camera viewing area is frequently an opening in a blackprint of the windshield. A blackprint is understood to mean a black frame in the outer area of the windshield. The blackprint is essentially non-transparent. A blackprint is used, in particular, in order to visually cover components and/or adhesive areas.

In one preferred embodiment of the present invention, in the case of an identified visual impairment, at least one of the following steps is carried out:
  output of a corresponding piece of information to the driver;
  storing of a corresponding piece of information in an on-board memory;
  compensation of the identified image structures during the analysis of the image data;
  deactivation of defined, in particular, safety-relevant camera functions.

This is understood to mean that one of the aforementioned steps is carried out if an essentially visual impairment of the view of the camera through the window is ascertained. This is then the case, for example, if the ascertained visual impairment is above a defined threshold value. The output of the information to the driver may, for example, take place visually on a display element or also acoustically over a loudspeaker. In addition to a warning, an instruction to visit a repair shop may also be output. Depending on the type and/or severity of the visual impairment, it is also possible to output a different piece of information to the driver. Depending on the type and/or the severity of the visual impairment, a different method step may be carried out. A compensation is further understood to mean an elimination of the identified impairment from the image data during the analysis. The elimination may also include disregarding the identified impairment.

In one alternative refinement of the present invention, the illumination takes place with the aid of incident light, the illumination being designed, in particular, as incident light dark-field illumination or incident light bright-field illumination.

An incident light dark-field illumination is understood to mean that incident light strikes the window surface at a large incidence angle. The image contrast arises mainly due to a change of direction of some light beams as a result of dispersion, diffraction, refraction and/or reflection. In the case of rough, in particular, low-reflecting surfaces, the lateral arrangement of the incident light dark-field illumination provides a local shadow formation so that the surface structures appear more three-dimensional. This effect may be caused by a one-sided illumination. An incident light bright-field illumination is understood to mean that incident light strikes the window surface at a small, essentially perpendicular incidence angle. The image contrast arises mainly as a result of the window structures absorbing a portion of the incident light and the corresponding area therefore appears darker.

In one alternative embodiment, it is also possible that the illumination takes place with the aid of light coupled into the window. The coupled-in light continues with a total reflection within the window. However, this light is not fully reflected at damage or other structural features of the window, but is partly decoupled.

In one advantageous embodiment of the present invention, the example method includes that an activation of the illumination when an illumination device is moved takes place when the moved illumination device is located in an area of the window that is not able to be detected by the driver, in particular, when the illumination device is located over the blackprint of the windshield of the motor vehicle.

This is understood to mean that the illumination device in an initial position is, for example, positioned in an area visible to the driver. In this initial position, the illumination device is normally not illuminated. Subsequently, a movement of the illumination device takes place from the area visible to the driver into an area not visible to the driver. An activation of the illumination takes place only when the illumination device is fully immersed in the area not visible to the driver. An activation of the illumination takes place, in particular, when the illumination device is located completely over the blackprint. A deactivation of the illumination takes place before the moved illumination device leaves the area of the window not visible to the driver. A deactivation of the illumination takes place, in particular, shortly before the illumination device leaves the blackprint area of the windshield.

In one possible embodiment of the present invention, the method includes that the visual impairment is analyzed while taking a comparison of at least two illuminated structural images of the window into account.

This is understood to mean that the visual impairment is ascertained while taking two or more different structural images into account. An illumination of the window takes place in each case in order to generate illuminated structural images and thus to be able to ascertain enhanced image structures. Based on the different structural images, it is advantageously possible to ascertain more exactly the existing image structures. To generate the advantageous difference, the illumination may be spatially changed. Thus, it is possible, for example, that the camera records multiple images while an illumination device integrated into a windshield wiper is moved over the recording area. Alternatively or in addition, the illumination may take place at timed intervals. Thus, it is possible, for example, that the camera records one image respectively with each wiping operation when an illumination device integrated in the windshield wiper is at a defined position and compares these images with one another. It would, of course, also be possible to record an image of the same location after a defined time frame, for example, 1 hour, or after each start-up of the vehicle and to compare these images with one another. Alternatively or in addition, the illumination may be characteristically varied, for example, with respect to the light wavelength. It is, of course, also possible that the illumination is designed both as dark-field illumination as well as bright-field illumination, and each of the structural images thus generated is analyzed in order to ascertain the actual image structures and thus, the visual impairments.

In one preferred refinement of the present invention, the method is characterized in that when an illumination device is moved, at least two illuminated structural images of the window at different positions of the illumination device are taken into account for analyzing the visual impairment.

"Taking into account" in this case may be understood to mean, in particular, an ascertainment and/or a storing and/or an evaluation.

In one alternative specific embodiment of the present invention, the method includes that at least two illuminated structural images of the window at different points in time are taken into account for analyzing the visual impairment, in particular, when an illumination device is moved, two illuminated structural images of the window of different points in time with the illumination device in the same position are taken into account.

This is understood, for example, to mean that a determination and a comparison of at least two enhanced structural images take place with the light source in the same position at different points in time. The method may include the additional method step:

Illumination and recording of two illuminated structural images at different points in time.

In an advantageous refinement of the present invention, the method includes that for the analysis of the visual impairment, at least two illuminated structural images of the window are taken into account at different light wavelengths, in particular when, in a moved illumination device, two illuminated structural images of the window at equal position of the illumination device are taken into account at different light wavelengths.

For example, it is understood here that a determination and a comparison of at least two enhanced structural images take place at the same position of the light source, the light source, however, operates at different light wavelengths in these cases.

This method may, for example, be implemented in software or hardware or in a mixed form of software and hardware, for example, in a control unit.

The approach presented herein further provides a device, which is designed to carry out, activate, or implement the steps of a variant of a method presented herein in corresponding devices.

With this embodiment variant of the present invention in the form of a device as well, the object of the present invention may be achieved advantageously and with high validity. Thus, a device may be considered to be: a camera and/or an illumination device and/or a windshield wiper, in particular, a windshield wiper that includes an integrated illumination device.

Thus, a device in accordance with an example embodiment of the present invention is advantageously designed as an illumination device. A division of the windshield into an area visible and viewable by the driver and an area view-protected from the driver is advantageously present. The area that is view-protected for the driver may, in turn, include a subsection which allows for a viewing area for the camera. The illumination device in this case is configured and/or positioned in such a way that the illumination device does not illuminate, for example, a driver viewing area of the windshield. The field of vision of the driver is advantageously not illuminated. The device is further characterized, for example, in that the illumination device is configured in such a way that the illumination device illuminates a viewing area of the camera.

In one advantageous specific embodiment of the present invention, the device is positioned at least partially on the outside of the window. This is understood to mean that at least parts of the device are positioned on the outside of the window. The outside of the window is understood, for example, to mean the area of the windshield, which is directed toward the surroundings of the motor vehicle and not toward the interior of the motor vehicle. A very exact ascertainment of visual impairments on the outside of the window may thereby advantageously take place. The illumination device is positioned, for example, for illumination on the outside of the windshield. As a result, the illumination of the windshield also takes place on the outside. Since scratches and stone damage occur, in particular, on the outside of the window, it is possible to validly identify the defects via an incident light illumination from outside.

In one possible embodiment of the present invention, the device is integrated at least partially in a windshield wiper and/or is designed to be mountable on a windshield wiper. This is understood, for example, to mean that the device includes an illumination device for illuminating the window. The illumination device is advantageously integrated into a windshield wiper and/or is designed so that the illumination device may be mounted on a windshield wiper.

In one preferred embodiment of the present invention, the device includes an illumination device for illuminating the window, the illumination device being designed in such a way that an illumination takes place only over a subsection of the window.

This is understood, for example, to mean that the illumination is integrated into a windshield wiper and that an illumination does not take place over the entire length of the windshield wiper. The illumination advantageously takes place limited to a subsection of the windshield wiper and/or to a partial length of the windshield wiper blade.

In one alternative refinement of the present invention, the device includes a light source, the light source being formed in and/or at an end web of the windshield wiper and/or a center web of the windshield wiper and/or a back web of the windshield wiper.

This is understood to mean that the illumination device includes a light source for illumination, the light source capable of being formed at different or multiple positions. For example, the light source is formed in an end web and/or in a center web of the windshield wiper. This may enable, in particular, a dark-field illumination of the viewing area of the camera. Alternatively, the light source is formed in and/or on a back web of the window wiper. This may enable, in particular, a bright-field illumination of the viewing area of the camera.

In one possible specific embodiment of the present invention, the device includes a light guiding module, which is formed in and/or on a back web of the windshield wiper, and the light guiding module enables, in particular, a linear or planar lighting on the basis of a spot light source.

This is understood to mean that with the aid of a light guiding module, for example, a spot light of a light source—for example, in an end web and/or in a center web of the headlight —a linear or planar illumination of the windshield is made possible. This may, for example, also enable a bright-field illumination when a light source is formed in an end web and/or a center web of the windshield wiper, the light being transmitted from there with the aid of the light guiding module—which is formed at the back web of the windshield wiper—and forming an planar or linear incident light bright-light illumination along the light guiding module. A linear and/or planar lighting of a subsection of the windshield may be enabled in accordance with the length and orientation of the light guiding module.

A device may further be understood to mean an electrical device, which processes sensor signals and outputs control signals and/or data signals as a function thereof. The device may include an interface, which may be designed in hardware and/or in software. In a hardware design, the interfaces may, for example, be part of a so-called system ASIC, which contains a wide variety of functions of the device. It is also possible, however, for the interfaces to be separate, integrated circuits or to be made at least partly of discrete components. In a software design, the interfaces may be software modules, which are present, for example, on a microcontroller alongside other software modules. Thus, a device may include a control unit for the camera, a control unit for the windshield wiper, a control unit for the driver assistance system.

Also advantageous is a computer program product or computer program having program code, which may be stored on a machine-readable medium or memory medium, such as a semiconductor memory, a hard disk memory or an optical memory, and which is used for carrying out, implementing and/or activating the steps of the method according to one of the previously described specific embodiments, when the program product or program is executed on a computer or a device.

It should be noted that the features individually cited in the description may be combined with one another in an arbitrary, technically meaningful manner, and may show further embodiments of the present invention. Additional features and the practicality of the present invention result from the description of exemplary embodiments based on the figures.

DETAILED DESCRIPTION OF EXAMPLE EMBODIMENTS

Figure 1:
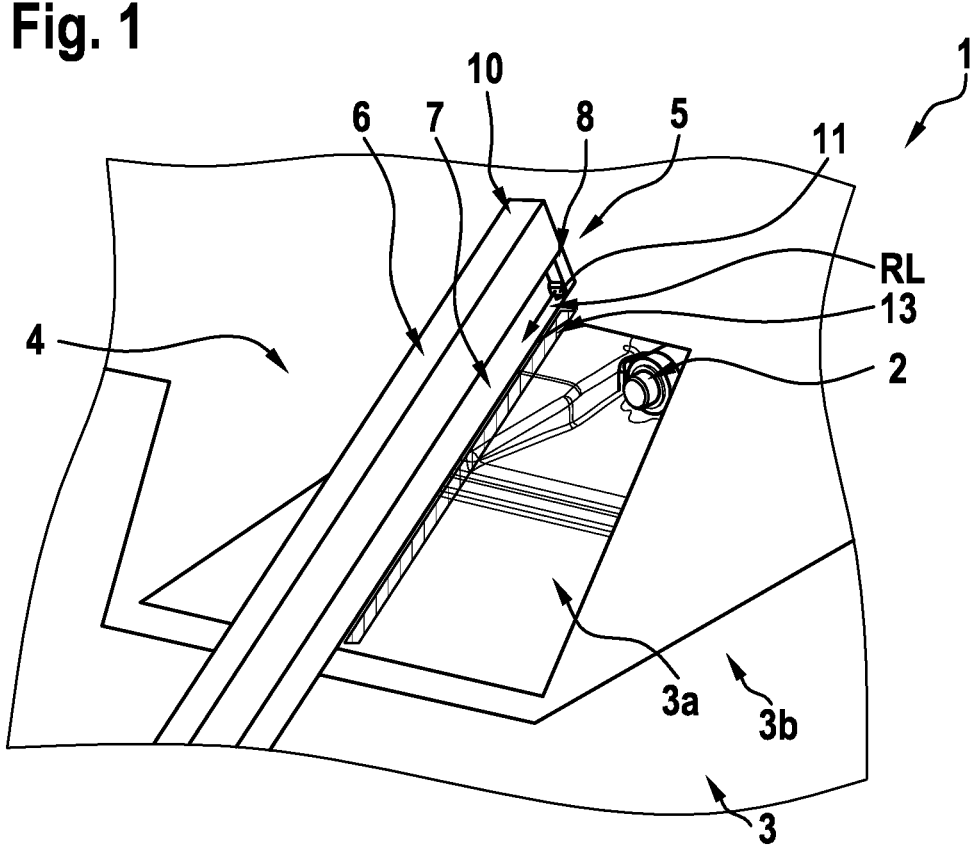
FIG. 1 shows an illumination device including a light source in the end web of the windshield wiper in accordance with an example embodiment of the present invention.

FIG. 1 shows a device according to a first specific embodiment of the present invention. Shown here is a camera 2 as well as a window 3 of a motor vehicle 1 not shown. The window 3 includes a non-transparent overprint 4, a so-called blackprint. The remaining area of the window 3 may be defined as the driver viewing area 3b. Blackprint 4 leaves an area blank, viewing area 3a for the camera. This camera viewing area 3a is also not visible to the driver, since it is covered by the camera module mounted on the inside of the window. A windshield wiper 6 is also shown, which includes an illuminating device 5. Windshield wiper 6 also includes, of course, a windshield wiper blade 7. Windshield wiper 6 includes a back web 10, as well as an end web 8. Illumination device 5 includes a light source 11. Light source 11 is integrated into end web 8. Light source 11 is designed, in particular, as an LED light emitter. Light sources 11 radiate in illumination direction RL and illuminate an illumination area 13. This illumination area 13 may also be considered to be the test area of window 3. Due to the movement of windshield wiper 6 and associated illumination device 5, test area 13 also changes in accordance with the movement of windshield wiper 6 when light source 11 is activated. In the present exemplary embodiment, the illumination is designed as incident light dark-field illumination. The light from light sources 11 in this case strikes window 3 at a large incidence angle. This results in a high image contrast due to the change in the direction of some light beams as a result of dispersion, diffraction, refraction and/or reflection. In the case of rough, in particular, low-reflecting surfaces, the lateral arrangement of the incident light dark-field illumination provides a local shadow formation so that the surface structures appear more three-dimensional. Such surface structures may form as a result of cracks or stone damage in the window or of age-related degradation of the window. Camera 2 records the surface structures enhanced with the aid of illumination. In the analysis and evaluation of the image data of camera 2 with the aid of a control unit 14 not shown, an evaluation is carried out as to whether the existing visual impairment resulting from the surface structures is acceptable or may represent a risk of a false image evaluation. In the case of an identified risk, additional steps are initiated.

To optimize illumination area 13, a light shaping element may be placed in front of the light source. In this case, lenses or apertures are suitable, for example. Such light shaping elements make it possible to bundle the light beams and to improve the edge lighting effect and to reduce or to avoid light reflections from other parts of windshield wiper 6.

Figure 2:
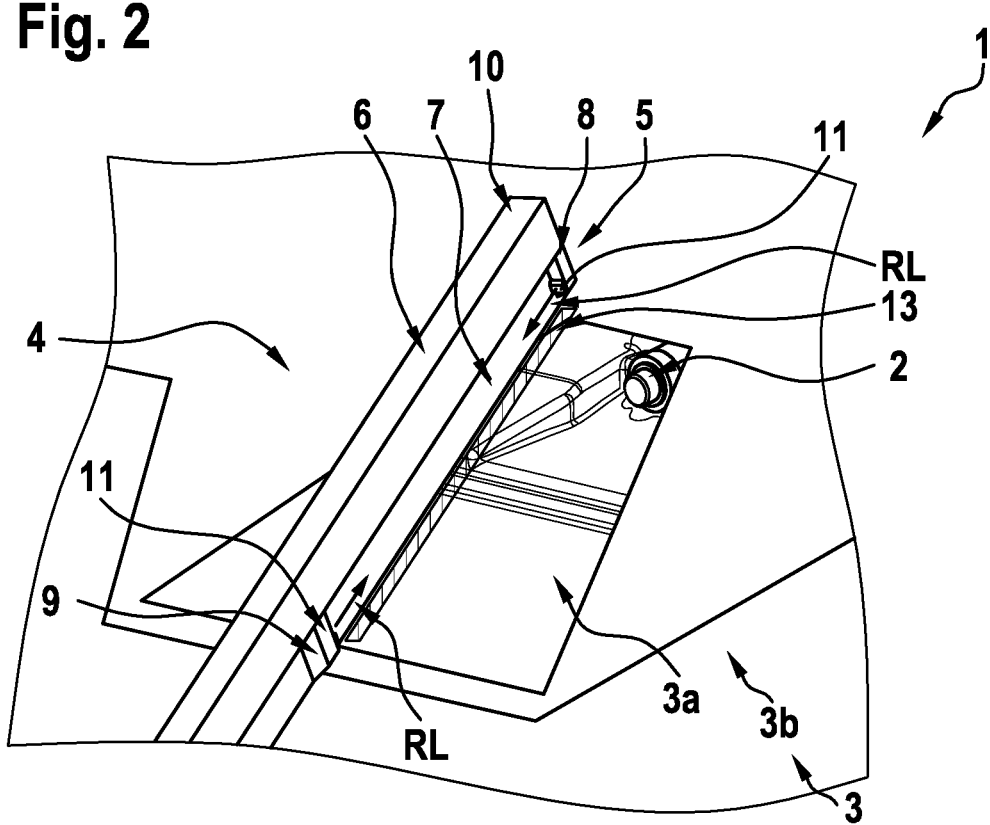
FIG. 2 shows an illumination device including two light sources in the end web and the center web of the windshield wiper in accordance with an example embodiment of the present invention.

FIG. 2 shows a device according to one further specific embodiment of the present invention including two light sources. In this regard, reference is made essentially to the statements relating to FIG. 1 and the existing differences are described below. In addition to a back web 10 as well as an end web 8, windshield wiper 6 in this case also includes a center web 9. Illumination device 5 includes two light sources 11. A first light source is integrated into end web 8. An additional light source is integrated into center web 9. Light sources 11 each radiate in illumination direction RL and illuminate an illumination area 13. In this way, it is possible to optimize both the illumination intensity as well as the focusing of the illumination.

A light barrier element may also be designed for optimizing the illumination. This element is advantageously designed and situated in such a way that it prevents a light beam emitted by a light source 11 from striking driver viewing area 3b. Center web 9 of windshield wiper may, for example, be designed in such a way that it serves as a barrier element for light beams, which are radiated by light source 11 integrated into end web 8 of windshield wiper 6. The light barrier element is advantageously positioned approximately at the point at which the blackprint ends. A blinding of the driver may thus advantageously be avoided.

Figure 3:
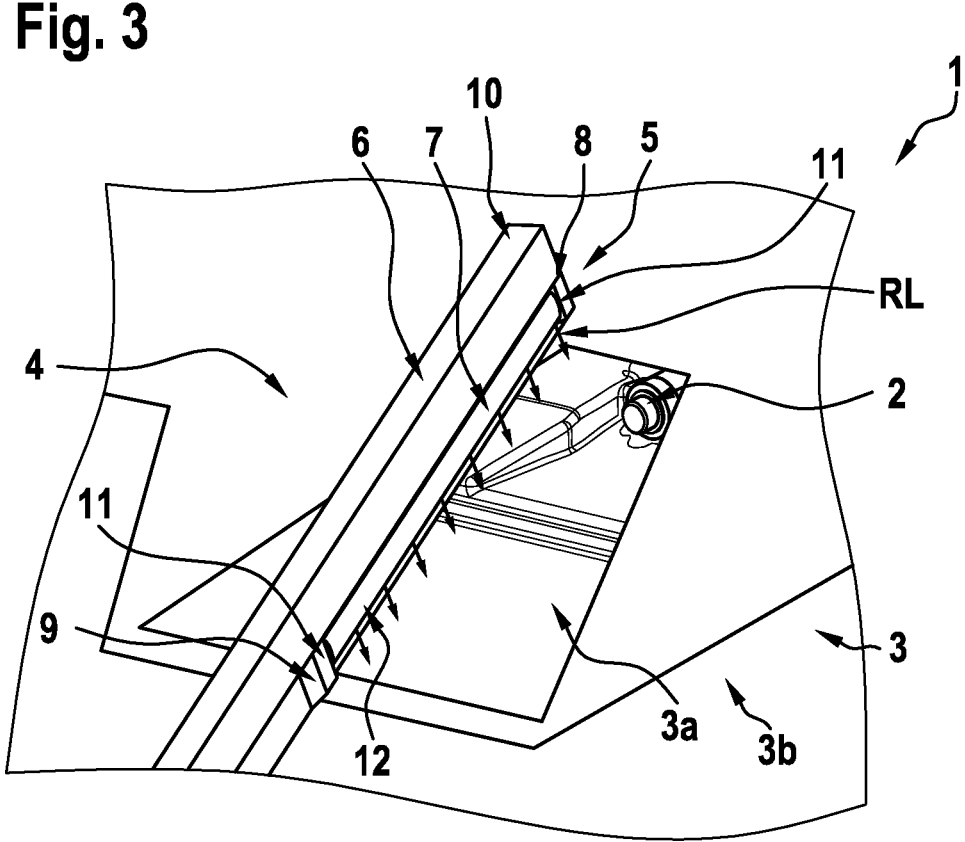
FIG. 3 shows an illumination device including light sources in the end web and center web of the windshield wiper, as well as a light guiding module in accordance with an example embodiment of the present invention.

FIG. 3 shows a device according to one alternative specific embodiment of the present invention including light sources in the end web and center web of the windshield wiper, as well as a light guiding module. In this regard, reference is made essentially to the statements relating to FIG. 1 and the existing differences are described below. In this case, a light source 11 is also integrated into end web 8 of windshield wiper 6. However, this light source does not radiate directly on camera viewing area 3a. Instead, a light guiding module 12 is also present, which absorbs and transmits the emitted light beams. The light beams are accordingly decoupled via light guiding module 12 in such a way that the light beams exit again distributed over the length of light guiding module 12. Light guiding module 12 is further designed in such a way that the decoupled light beams strike the camera viewing area at a low incidence angle. The illumination direction is visualized with the aid of direction arrows RL. Accordingly, an incident light bright-field illumination is made possible as a result. The present image structures are advantageously enhanced as a result. A uniform illumination is thereby advantageously enabled. An exact length limitation of the illumination may also be enabled.

In one preferred embodiment—as also shown in FIG. 3—two light sources 11 are employed. The first light source is integrated into end web 8 of windshield wiper 6. Second light source 11 is integrated into center web 9 of windshield wiper 6. Both light sources 11 are connected to light guiding module 12 in such a way that both light sources 11 couple light into light guiding module 12. Light guiding module 12 operates as previously described. This enables a uniform illumination over the length of light guiding module 12.

Figure 4:
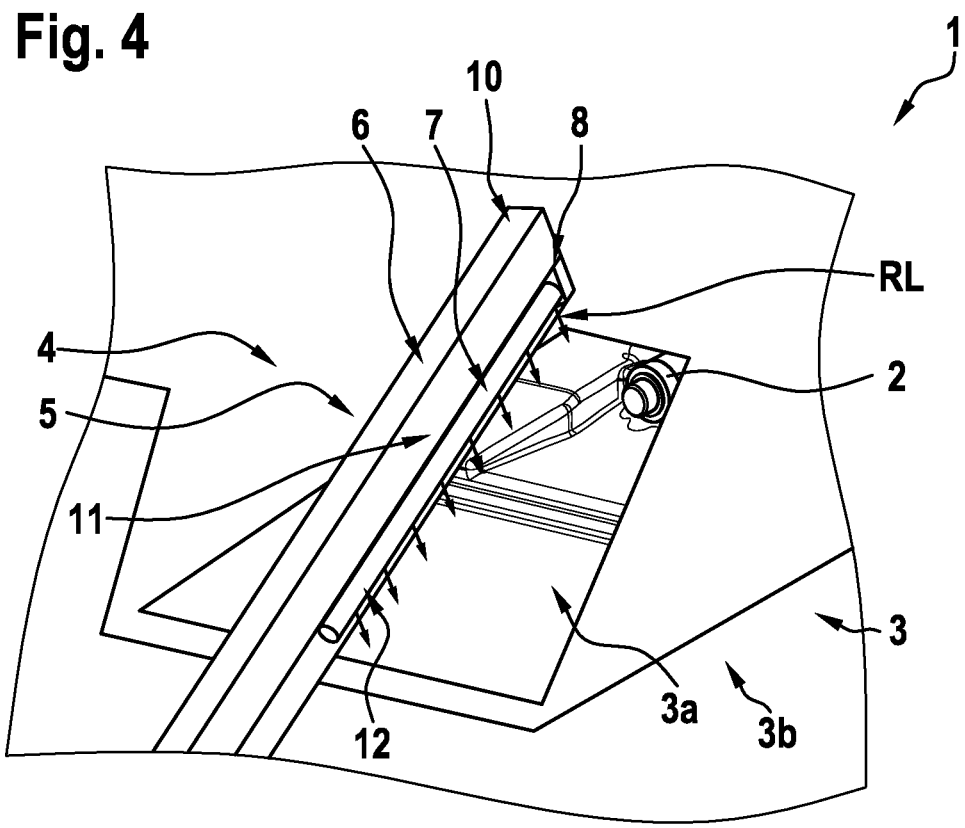
FIG. 4 shows an illumination device including a light source in the back web of the windshield wiper, as well as a light guiding module in accordance with an example embodiment of the present invention.

FIG. 4 shows a device according to one further specific embodiment of the present invention including a light source in the back web of the windshield wiper, as well as a light guiding module. In this regard, reference is made essentially to the statements relating to FIG. 3 and the existing differences are described below. In one alternative embodiment, light source 11 is integrated into back web 10 of windshield wiper 6. Light source 11 in this case may have a punctiform or monoplanar design. In the case of punctiform light sources, in particular, a combination including a light guiding module 12 is advantageous, with the aid of which an illumination distributed uniformly over a particular length is made possible. In turn, an incident light bright-light illumination is made possible by the positioning of light source 11 in back web 10—as well as or by using light guiding module 12.

Figure 5A:
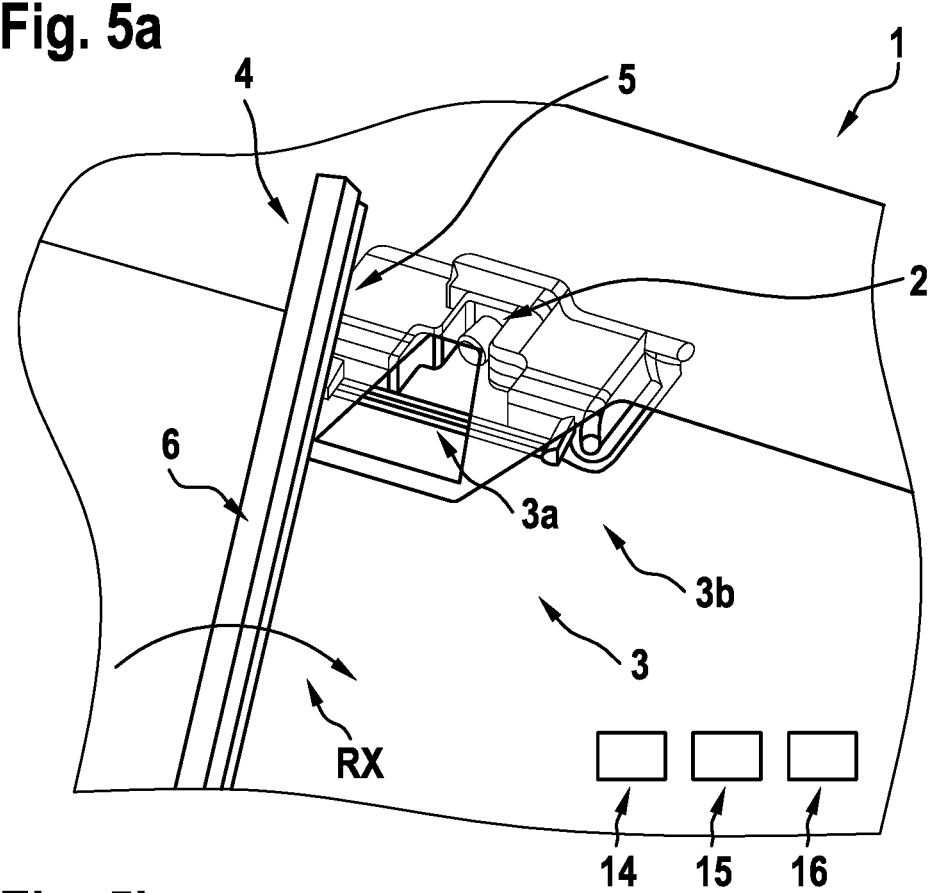
FIGS. 5a and 5b show a switch-on and switch-off point of the illumination in a moved windshield wiper in accordance with an example embodiment of the present invention.
Figure 5B:
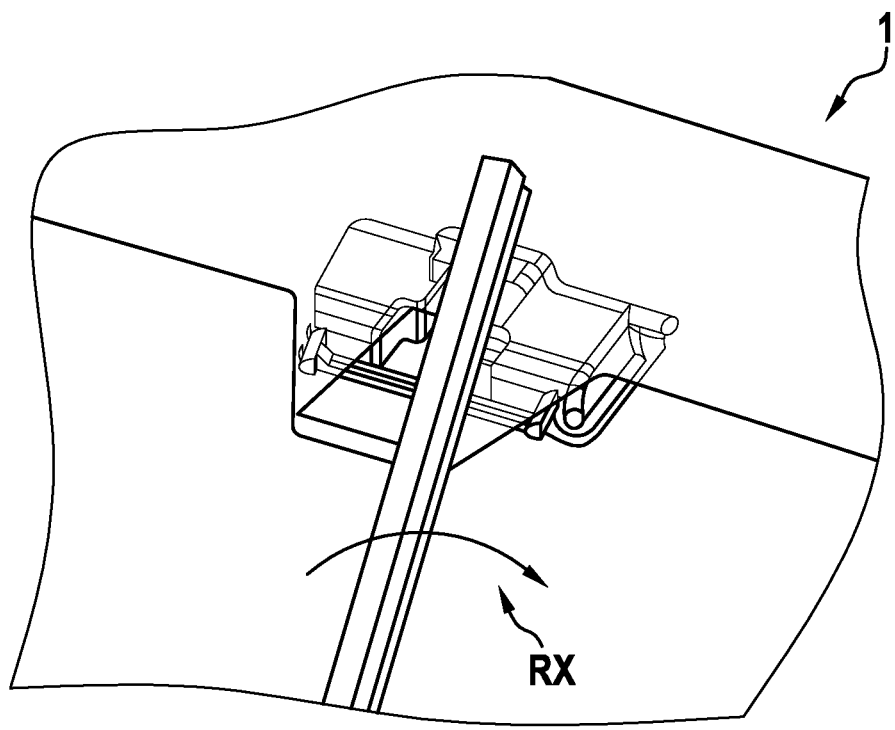

FIGS. 5a and 5b show a device when carrying out a method according to one embodiment of the present invention. For a general description of the device, reference is made to the previous statements. A control unit 14 for controlling the camera and/or the illumination device and/or the windshield wiper is/are also schematically shown. An on-board error memory 15 is also depicted. An output device 16 is also depicted, with which a piece of information may be output to a driver. An output may, for example, take place visually and/or acoustically.

FIG. 5a shows at which point in time illumination device 5 is activated. The illumination device is deactivated in the initial position of windshield wiper 6. Windshield wiper 6 is subsequently activated and moved in movement direction RX. The activation of the illumination device advantageously takes place when illumination device 5 is situated completely over blackprint 4. The illumination remains activated, for example, during the further movement of illumination device 5 over camera viewing area 3a. The illumination produces an illumination area or test area as previously described. The illumination area or test area is continually shifted by the movement of illumination device 5 in such a way that after a certain movement range a complete coverage or checking of camera viewing area 3a is made possible.

FIG. 5b shows at which point in time illumination device 5 is deactivated. Thus, windshield wiper 6 reaches a point after a further movement in movement direction RX at which illumination device 5 has reached the outer edge area of blackprint 4. At this point in time, a deactivation of the illumination takes place in order to prevent a blinding of the driver, which could occur if the illumination were to strike window 3 in driver viewing area 3b. Blackprint 4 as well as the design of illumination device 5 in windshield wiper 6 are further coordinated with one another in such a way that at the deactivation point, camera viewing area 3a has been fully passed over and checked.

Figure 6:
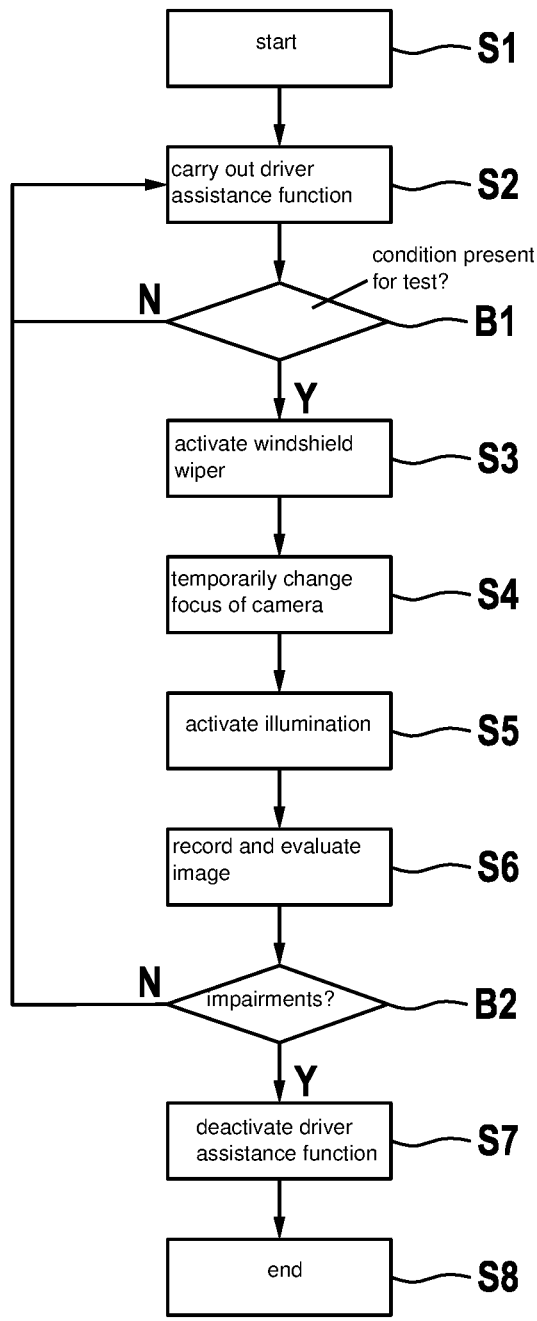
FIG. 6 shows a representation of the method steps of one specific example embodiment of the present invention.

FIG. 6 shows a representation of the method steps of one specific embodiment of the present invention. This is a test for checking a possible visual impairment of a camera due to deficiencies in a camera viewing area. Here, the start of the method takes place in a first step S1, for example, the start of the motor vehicle. In a second step S2, a driver assistance function is carried out assisted by camera 2. Subsequently, it is checked in a condition B1 whether the conditions for carrying out a test are present. It may be advantageous, for example, to carry out the test continuously or only after a certain period of time. If the condition is not yet met (N-branch), the driver assistance function is carried out with no test. If, on the other hand, condition B1 is met (Y-branch), the test for visual impairments is carried out. For this purpose, the windshield wiper is activated in a step S3. Under dry conditions, the windshield wiper spray system may also be activated in order to facilitate the sliding of the windshield wipers. In a next step S4, the focusing of the camera is temporarily changed. While the focusing is normally adjusted on one point located a certain distance in front of the windshield, the focusing is now adjusted essentially to the windshield to be checked. This may take place, for example, with the aid of a lens system or, if necessary, also with the aid of software. Once the windshield wiper has reached the illumination activation point, the illumination is activated in a step S5. In a step S6, the image data are recorded and evaluated. In this case, merely 1 image may be generated and evaluated. Alternatively, multiple images may be generated and evaluated, so that it is possible to analyze the entire camera viewing area. During the evaluation, a comparison may also be made with previous recordings and/or other reference images. With the aid of following condition B2, it is checked whether impairments have been ascertained and whether these impairments are above a defined threshold value. If this is not the case (N-branch), a defect-free system is assumed and the driver assistance function is further carried out. If, however, a defined threshold value is exceeded (Y-branch), a visual impairment of the camera due to a defective camera viewing area is assumed. In this case, the driver assistance function is deactivated in a subsequent step S7. A corresponding feedback (for example, acoustic and/or visual) to the driver may also take place in this step. A corresponding entry into an error memory may also take place in this step. The method is ended with subsequent step S8.

What is claimed is:

1. A method for determining a structural image of a window of a motor vehicle using a camera, the window separating the camera from surroundings of the motor vehicle, the method comprising:

highlighting image structures present in the structural image using an illumination of the window using at least one light source positioned outside of an interior of the motor vehicle, the illumination of the window projecting light from the at least one light source to be incident on a surface of the window facing the outside of the interior of the motor vehicle, the light travelling from the at least one light source outside of the interior of the motor vehicle to the surface of the window facing the outside of the interior of the motor vehicle, the image structures being suitable for ascertaining a visual impairment of a viewing of the camera through the window, the image structures including at least one of: mechanical damage to the window, or age-related degradation of the window;

wherein the at least one light source providing the light incident on the surface of the window facing the outside of the interior of the motor vehicle is at least one of: integrated at least partially into a windshield wiper, or mounted on the windshield wiper;

wherein the illumination being configured in such a way that the illumination is not detected by a driver; and wherein the at least one light source is activated only for a predetermined range of positions of the windshield wiper, and deactivated at other positions of the windshield wiper.

2. The method as recited in claim 1, further comprising:
detecting the visual impairment;
based on detecting the visual impairment, performing at least one of the following steps:
  outputting a corresponding piece of information to the driver;
  storing a corresponding piece of information in an on-board memory;
  compensating for the image structures during analysis of image data from the camera; or
  deactivating at least one defined, safety-relevant camera function.

3. The method as recited in claim 1, wherein the illumination is configured as incident light dark-field illumination.

4. The method as recited in claim 1, wherein the at least one light source is activated when the at least one light source is situated over an area of the window which is unable to be detected by the driver.

5. The method as recited in claim 4, wherein the area of the window which is unable to be detected by the driver is over a blackprint of a windshield of the motor vehicle.

6. The method as recited in claim 1, wherein the visual impairment is analyzed while taking a comparison of at least two illuminated structural images of the window into account.

7. The method as recited in claim 1, wherein when the at least one light source is moved, at least two illuminated structural images of the window at different positions of the at least one light source are taken into account for analyzing the visual impairment.

8. The method as recited in claim 1, wherein at least two illuminated structural images of the window at different points in time are taken into account for analyzing the visual impairment, when the at least one light source is moved, wherein two illuminated structural images of the window at a same position of the at least one light source at different points in time are taken into account.

9. The method as recited in claim 1, wherein at least two illuminated structural images of the window at different light wavelengths are taken into account for analyzing the visual impairment when the at least one light source an illumination device is moved, two illuminated structural images of the window at a same position of the at least one light source having different wavelengths are taken into account.

10. A device configured to determine a structural image of a window of a motor vehicle using a camera, the window separating the camera from surroundings of the motor vehicle, the device including:
  at least one light source configured to be positioned outside of an interior of the motor vehicle, the at least one light source at least one of: integrated at least partially into a windshield wiper, or mounted on a windshield wiper; and
  a control unit to control the at least one light source to highlight image structures present in the structural image using an illumination of the window using the at least one light source, the illumination of the window projecting light from the at least one light source to be incident on a surface of the window facing the outside of the interior of the motor vehicle, the light travelling from the at least one light source outside of the interior of the motor vehicle to the surface of the window facing the outside of the interior of the motor vehicle, the image structures being suitable for ascertaining a visual impairment of a viewing of the camera through the window, the image structures including at least one of: mechanical damage to the window, or age-related degradation of the window;
  wherein the illumination being configured in such a way that the illumination is not detected by a driver; and
  wherein the at least one light source is activated only for a predetermined range of positions of the windshield wiper, and deactivated at other positions of the windshield wiper.

11. The device as recited in claim 10, wherein the at least one light source is configured in such a way that the illumination takes place exclusively over a subsection of the window.

12. The device as recited in claim 10, wherein the at least one light source is formed in and/or on at least one of: (i) an end web of a windshield wiper, (ii) a center web of the windshield wiper, or (iii) a back web of the windshield wiper.

13. The device as recited in claim 10, wherein the device includes a light guiding module, which is formed in and/or on a back web of the windshield wiper, and the light guiding module, enabling a linear or planar illumination based on the at least one light source.

14. The method as recited in claim 1, wherein the window is a windshield of the motor vehicle, the method further comprising:
  positioning the camera to face an opening in a blackprint of the windshield;
  wherein the illumination of the window using the at least one light source illuminates the opening in the blackprint of the windshield.

15. The method as recited in claim 14, further comprising:
using the camera as part of a driver assistance system.

16. The method as recited in claim 1, wherein the illumination is configured as incident light bright-field illumination.

17. The method as recited in claim 1, wherein the at least one light source is deactivated at an initial position of the windshield wiper, activated at a second position of the windshield wiper different than the initial position, and deactivated again at a third position of the windshield wiper different than the initial and second positions of the windshield wiper.

* * * * *